July 3, 1928.
S. LEVITT
1,676,036
PIPE COUPLING
Filed Oct. 11, 1919
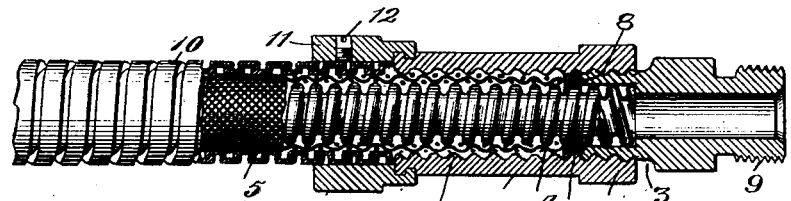
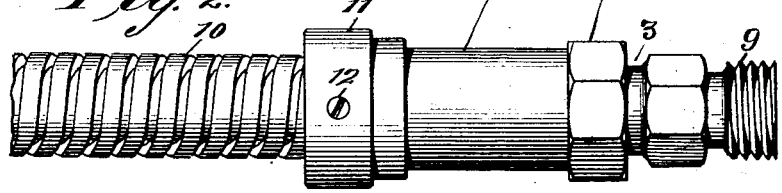
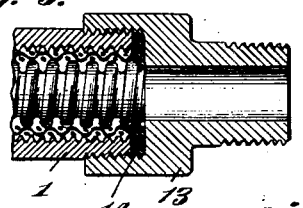
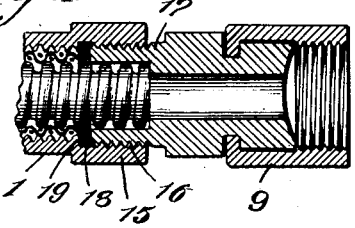
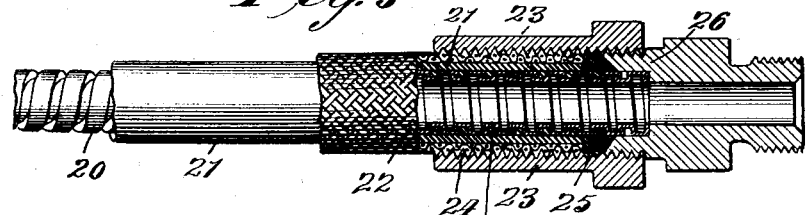
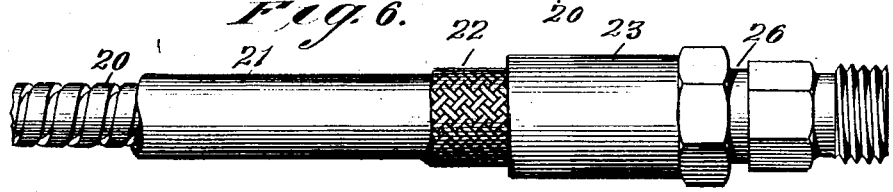
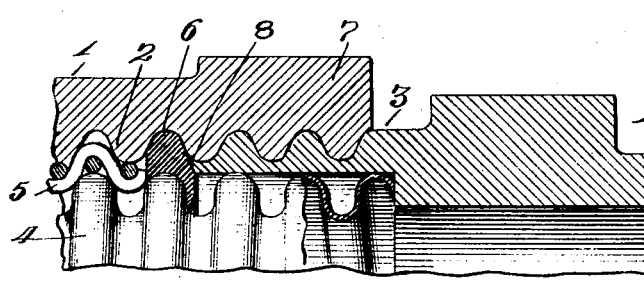
INVENTOR
Samuel Levitt
BY
ATTORNEY Patented July 3, 1928.

1,676,036

UNITED STATES PATENT OFFICE.

SAMUEL LEVITT, OF BROOKLYN, NEW YORK, ASSIGNOR TO UNITED METAL HOSE COMPANY, INC., OF NEW YORK, N. Y., A CORPORATION OF NEW YORK.

PIPE COUPLING.

Application filed October 11, 1919. Serial No. 330,013.

This invention relates to pipe couplings and especially to couplings for use with flexible metal hose having a covering or sheath thereon of braided wire, fabric and rubber, or the like. Among the objects of the invention are the provision of a coupling adapted to have a sealed connection with the flexible tubing and also formed for enclosing and securing the end of the covering material; the provision of a coupling which may be readily attached without the use of solder; and the provision of improved means for mounting an armor upon the outside of the hose in such a way that twisting of the hose when manipulating the coupling is impossible.

In the accompanying drawings which form a part of this specification and in which I have shown certain preferred embodiments of my invention as illustrative of the principle thereof and the best mode now known to me for performing the same.

Figure 1 is a longitudinal sectional view of one form of coupling applied to a flexible metal tube having a braided wire sheath;

Figure 2 is a side elevation of the structure shown in Figure 1;

Figure 3 is a longitudinal sectional view through a part of a coupling showing a modified construction;

Figure 4 is a similar view showing another modified construction;

Figure 5 is a view similar to Figure 1 illustrating a somewhat modified form of coupling as applied to a flexible metal tube having a rubber and fabric covering;

Figure 6 is a side elevation of the structure shown in Figure 5 and

Figure 7 is a fragmentary sectional view on an enlarged scale illustrating certain features of the construction shown in Figure 1.

Referring to the drawings in detail, the coupling shown in Figures 1 and 2 comprises a coupling sleeve 1 internally threaded throughout its length, as indicated at 2, and into the outer end of which is screwed a coupling nut or plug member 3. The coupling is shown as applied to a flexible hose comprising the flexible metal tube 4, which in the present instance is shown as a helically corrugated seamless tube, although any other form of tubing may be used, this tube having a covering comprising in the present instance a braided wire tube 5. When applying the coupling, the tube 5 is first cut off somewhat shorter than the tube 4, and a packing is then applied to the flexible metal tube adjacent to the end of the sheath, preferably by winding asbestos cord about the tubing at that point, as indicated at 6. The sleeve 1 is then screwed upon the sheath or braided wire tube 5, the sleeve being of such internal diameter that it will force the wire fabric firmly into the corrugations of the tube 4 so as to clamp the sleeve 1 upon the hose and also to hold the sheath 5 firmly in position with respect to the flexible metal tube. Preferably the threads 2 are of the same pitch as the spiral corrugations in the tube 4, as illustrated particularly in Figure 7, where it will be seen that the threads on the sleeve registering with the corrugations on the tube 4 effectively clamp the tube, wire braiding and sleeve together. As shown in this figure these threads are preferably of rounded configuration where the coupling is to be utilized with a tube having a braided wire covering. This form of thread serves to clamp the braided wire covering firmly without danger of cutting the wires. After the application of the sleeve as described, the coupling member 3 which is recessed as indicated at 7 to receive the projecting end of the tube 4, is screwed into the outer end of the sleeve and against the packing 6 which it compresses firmly against the end of the braided tube and into the corrugations of the flexible metal tube so as to effectively seal the joint between the coupling and the inner fluid tight tube and prevent leakage. The end of the member 3 which engages the packing is preferably beveled inwardly as shown at 8, so as to force the packing more firmly against the inner tube. The firm clamping of the braided wire tube within the coupling is in some instances of particular importance as this braided wire acts as a tension element when used with certain kinds of flexible metal tubing to prevent the elongation of such tubing under internal pressure. The coupling 3 may be formed for engagement with another coupling or other device in any suitable manner, for instance by having the spigot end 9 shown in Figures 1 and 2; or it may be formed as one member of a union as shown, for instance, in Figure 4.

In some instances it is desirable to provide the tubing with an additional armor which may be in the form of a spirally wound flexible metal tubing 10 as shown in Figures 1 and 2. Such tubing may be attached in any suitable manner. For instance, it may have its end fastened within the bore of a swivel sleeve 11 which is mounted to turn freely on the end of the coupling sleeve 1. Any suitable means for attaching the armor to the sleeve may be employed, such for instance as the set screw 12. By attaching the armor to a sleeve which is free to swivel with respect to the coupling it will be seen that it is impossible to turn the coupling by twisting the armor. The coupling can only be operated by a suitable wrench in the intended manner. In this way danger of twisting off the hose when screwing up or unscrewing the coupling is avoided. In short hose sections the armor may be carried throughout the length of the hose and secured in a swivel sleeve of the character described on each coupling so that the whole outer surface of the hose section between the couplings is revoluble.

In Figure 3 I have shown a somewhat modified form of coupling in which the coupling sleeve screwed on to the flexible tube and its sheath is engaged by a coupling cap 13 screwing on to the outside of the sleeve instead of into the same as in the case of the plug 3 shown in Figures 1 and 2, but serving a similar purpose and compressing a packing 14 around the flexible tubing so as to prevent leakage.

In Figure 4 another modified coupling is shown in which the coupling sleeve instead of having a continuous thread 2 extending throughout its length has a bell mouth 15, the internal diameter of which is somewhat larger than the diameter of the remainder of the sleeve and has an internal thread 16 engaged by the screw threaded portion of the coupling plug 17. A packing 18 is compressed between the end of the plug member and the shoulder 19 formed inside of the sleeve. This figure shows the member 17 as forming one member of a union, as already mentioned.

Figures 5 and 6 show the application of my invention to a flexible metal tube having a fabric and rubber covering. As here illustrated, the tube 20 is shown as of the spirally wound type, although any other type may be utilized in place thereof. This tube is covered with a layer of rubber 21 over which are a layer or layers of fabric 22. The coupling comprises an internally threaded sleeve 23, preferably having an ordinary V thread as indicated at 24, this thread screwing tightly on to the fabric 22 with which it engages, very firmly as the internal metal tube 20 offers sufficient resistance to prevent the hose from collapsing. Before applying the sleeve 23 to the hose, the covering is preferably stripped back somewhat from the end of the metal tube so as to leave the latter exposed, and a packing 25 is applied preferably by winding asbestos cord around the metal tube adjacent to the end of the covering. The coupling is completed by screwing the coupling plug 26 into the end of the sleeve 23 so as to compress the packing and to force it tightly against the metal tube on one side, and into the threads of the sleeve 23 on the other, thus effectually preventing leakage and also preventing access of the contents of the hose to the rubber and fabric casing thereof, so as to protect the same from the unfavorable action of any substance which may flow through the hose.

The coupling described is extremely simple and easy to apply, and is also very effective especially for the smaller sizes of hose. No soldering or other complicated process is required, and the coupling may readily be applied to the tubing after it has been covered, instead of necessitating the application of the coupling before the covering of the tubing, as is now required with the forms of coupling most commonly utilized with small flexible metal tubing. A substantial economy in the manufacturing cost results, delays are avoided and at the same time a better finished article is produced, as the ends of the covering are firmly held within the coupling itself.

While I have illustrated and described in detail certain preferred embodiments of the invention, it will be understood that modifications may be made in carrying the same out, and I therefore do not wish to be limited to the precise constructions described and shown, but intend to cover my invention broadly in whatever form its principle may be embodied.

Having thus described my invention, I claim:—

1. In a device of the character described, the combination of a hose comprising a flexible metal tube enclosed in a flexible sheath, and a coupling secured to said hose comprising a coupling sleeve having a uniform internal thread extending continuously therethrough and screwed on said sheath but extending beyond the same, and a coupling plug member having an externally threaded portion screwed into the outer end of said sleeve between the same and the flexible metal tube, said member being recessed to receive the end portion of said flexible metal tube.

2. In a device of the character described, the combination of a hose comprising a flexible metal tube enclosed in a flexible sheath, and a coupling secured to said hose comprising a coupling sleeve having a uniform internal thread extending continuously therethrough and screwed on said sheath but extending beyond the same, and a coupling plug member having an externally threaded portion screwed into the outer end of said sleeve between the same and the flexible metal tube, said member being recessed to receive the end portion of said flexible metal tube, and a packing compressed by the end of said plug member between said flexible metal tube and the inside of said coupling sleeve.

3. In a device of the character described, the combination of a hose comprising a flexible metal tube enclosed in a sheath, said sheath terminating short of the end of said flexible tube so as to expose a portion of the latter, a winding of asbestos cord around said exposed portion of the flexible tube adjacent to the end of said sheath, and a coupling attached to said hose comprising a coupling sleeve having a uniform internal thread extending continuously therethrough and screwed on to said sheath and projecting beyond the outer end of the same, and a coupling plug member having an externally threaded portion screwed into the end of said sleeve and engaging said asbestos packing, said member being recessed to receive the outer end of the flexible tube.

4. In a device of the character described, the combination of a hose comprising a flexible metal tube enclosed in a sheath, and a coupling comprising a sleeve having a uniform internal thread extending continuously therethrough and screwed on said sheath and adapted to force said sheath firmly into engagement with said flexible tube and also to clamp itself to said hose, a packing surrounding said flexible tube, and abutting against the end of said sheath, and a second coupling member having a screw threaded engagement with the inside of said coupling sleeve and serving to hold said packing in place against the end of said sheath.

5. In a device of the character described, the combination of a hose comprising a flexible corrugated metal tube inclosed in a flexible sheath, a coupling sleeve having an internal uniform thread extending therethrough and adapted to screw on said sheath and force the sheath into engagement with the corrugations of said flexible metal tube, a second coupling member having a screw threaded engagement with said thread of the coupling sleeve and having an abutment face thereon, and a flexible packing adapted to be compressed between said abutment face and the end of said sheath.

SAMUEL LEVITT.